United States Patent [19]
Yamamoto et al.

[11] Patent Number: 5,745,870
[45] Date of Patent: Apr. 28, 1998

[54] TRAVELING-PATH PREDICTION APPARATUS AND METHOD FOR VEHICLES

[75] Inventors: Yasunori Yamamoto, Higashi-Hiroshima; Ayumu Doi, Hatsukaichi; Tohru Yoshioka, Hiroshima, all of Japan

[73] Assignee: Mazda Motor Corporation, Hiroshima, Japan

[21] Appl. No.: 527,635

[22] Filed: Sep. 13, 1995

[30] Foreign Application Priority Data

Sep. 14, 1994 [JP] Japan .................. 6-220353

[51] Int. Cl.$^6$ .......................... G06F 165/00; G01S 7/41
[52] U.S. Cl. .................. 701/301; 701/96; 340/903; 340/435; 340/436; 342/454
[58] Field of Search ...................... 364/461, 460, 364/462, 426.044; 340/903, 901, 902, 943; 342/70, 454; 367/99, 118; 356/3, 141.1

[56] References Cited

U.S. PATENT DOCUMENTS

| | | | |
|---|---|---|---|
| 4,097,864 | 6/1978 | Endo et al. | 342/71 |
| 4,670,845 | 6/1987 | Etoh | 364/461 |
| 5,448,487 | 9/1995 | Arai | 364/424.033 |
| 5,461,357 | 10/1995 | Yoshioka et al. | 364/435 |
| 5,467,283 | 11/1995 | Butsuen et al. | 364/461 |
| 5,479,173 | 12/1995 | Yoshioka et al. | 342/70 |
| 5,530,651 | 6/1996 | Uemura et al. | 364/461 |

FOREIGN PATENT DOCUMENTS

| | | |
|---|---|---|
| 51-7892 | 3/1976 | Japan . |
| 4-369800 | 12/1992 | Japan . |

Primary Examiner—Tan Q. Nguyen

[57] ABSTRACT

A vehicle traveling-path prediction apparatus that detects a stationary object in front of the vehicle by utilizing an obstacle detection device instead of a yaw rate sensor, and predicts a traveling path based on the detected stationary object. The apparatus comprises control unit having an obstacle detection device which receives a detection signal from a radar head unit to detect an obstacle in front of the vehicle, stationary object detection device which receives an output signal from the obstacle detection device to detect the obstacle as a stationary object, a first traveling-path prediction device which receives an output signal from the stationary object detection device, and if there is a stationary object in front of the vehicle, calculates a radius of curvature R1 of a first traveling path, based on data indicative of running conditions of the vehicle, a second traveling-path prediction device which calculates a radius of curvature R2 of a second traveling path, based on a velocity V0 and a steering angle θH, and a selection device which receives a detection signal from the radar head unit and if there is no stationary object in front of the vehicle, selects the second traveling path R2 calculated by the second traveling-path prediction device.

33 Claims, 8 Drawing Sheets

TRAVELING-PATH PREDICTION APPARATUS AND METHOD FOR VEHICLES

BACKGROUND OF THE INVENTION

1. Field of the Invention

This invention relates to a traveling-path prediction apparatus and method for detecting obstacles in front of a vehicle and predicting the traveling path of the vehicle.

2. Description of Related Art

Japanese Patent Publication No. 51-7892 introduces an apparatus having traveling-path prediction means that predicts the traveling path of a vehicle from information on a steering angle or velocity. The apparatus picks up only obstacles within a range along the traveling path predicted by the traveling-path prediction means, and judges the possibility of contact between the vehicle and the obstacles.

There is a requirement for traveling-path prediction without a yaw rate sensor, since this traveling-path prediction means needs a yaw rate sensor for traveling-path prediction, which increases manufacturing costs.

Further, Japanese Patent Application Laid-Open No. 4-369800 introduces a curvature predicting system in which velocity detection means detects a velocity, distance measuring means measures a distance between a vehicle and an obstacle, and reflector-distance detection means calculates a distance between the reflectors based on the velocity and output from the distance measuring means, then curvature prediction means predicts a curvature of the traveling path.

Upon utilizing this system, the radius of curvature of the traveling path can be predicted before the vehicle enters a curved road area. However, the system, that predicts the curvature based on the distance between the reflectors, always requires a plurality of reflectors, and thus increases costs. As it is impossible to determine road curvature using a single reflector, the curvature predicting system must be constructed with at least a pair of reflectors.

SUMMARY OF THE INVENTION

Accordingly, the present invention has been made in view of the above situation, and an object of the present invention is to provide a vehicle traveling-path prediction apparatus and prediction method capable of detecting a stationary object using obstacle detection means instead of a yaw rate sensor, and predicting a traveling path based on the detected stationary object.

Accordingly, the above object is attained by providing a vehicle traveling-path prediction apparatus which detects an obstacle in front of a vehicle and predicts a traveling path of the vehicle based on the detected obstacle, comprising:

obstacle detection means for emitting a radar wave forward from the vehicle and detecting an obstacle existing in front of the vehicle;

stationary-status judgment means for judging whether the obstacle in front of the vehicle is in stationary status or not, based on the result from detection by the obstacle detection means; and traveling-path prediction means for predicting a traveling path of the vehicle, based on the result from judgment by the stationary-status judgment means.

Further, the present invention provides a vehicle traveling-path prediction apparatus which detects an obstacle in front of a vehicle and predicts a traveling path of the vehicle based on the detected obstacle, comprising:

obstacle detection means for emitting a radar wave forward from the vehicle and detecting a plurality of obstacles existing in front of the vehicle;

stationary-status judgment means for respectively judging whether the obstacles in front of the vehicle are in stationary status or not, based on the result from detection by the obstacle detection means;

object judgment means for judging whether status of the object judged as in the stationary status by the stationary-status judgment means has changed or not; and traveling-path prediction means for predicting a traveling path of the vehicle, based on the results from judgment by the object judgment means.

Further, the present invention provides a vehicle traveling-path prediction method for detecting an obstacle in front of a vehicle and predicting a traveling path of the vehicle based on the detected obstacle, comprising:

an obstacle detection step of emitting a radar wave forward from the vehicle and detecting an obstacle existing in front of the vehicle;

a stationary-status judgment step of judging whether the obstacle in front of the vehicle is in stationary status or not, based on the result from detection by the obstacle detection means; and a traveling-path prediction step of predicting a traveling path of the vehicle, based on the result from judgment by the stationary-status judgment means.

Further, the present invention provides a vehicle traveling-path prediction method for detecting an obstacle in front of a vehicle and predicting a traveling path of the vehicle based on the detected obstacle, comprising:

an obstacle detection step of emitting a radar wave forward from the vehicle and detecting an obstacle existing in front of the vehicle;

a stationary-status judgment step of judging whether the obstacle in front of the vehicle is in stationary status or not, based on the result from detection by the obstacle detection means;

an object judgment step of judging whether status of the object judged as in the stationary status at the stationary-status judgment step has changed or not; and a traveling-path prediction step of predicting a traveling path of the vehicle, based on the results from judgment by the object judgment means.

According to the present invention, a laser signal is emitted to detect an obstacle in front of a vehicle, and based on the detected result, whether the object is in stationary status or not is judged, and based on the judged result, a traveling path of the vehicle is predicted. Thus, the stationary object in front of the vehicle is utilized for prediction of traveling path, without using a yaw rate sensor.

Other objects and advantages besides those discussed above shall be apparent to those skilled in the art from the description of a preferred embodiment of the invention which follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
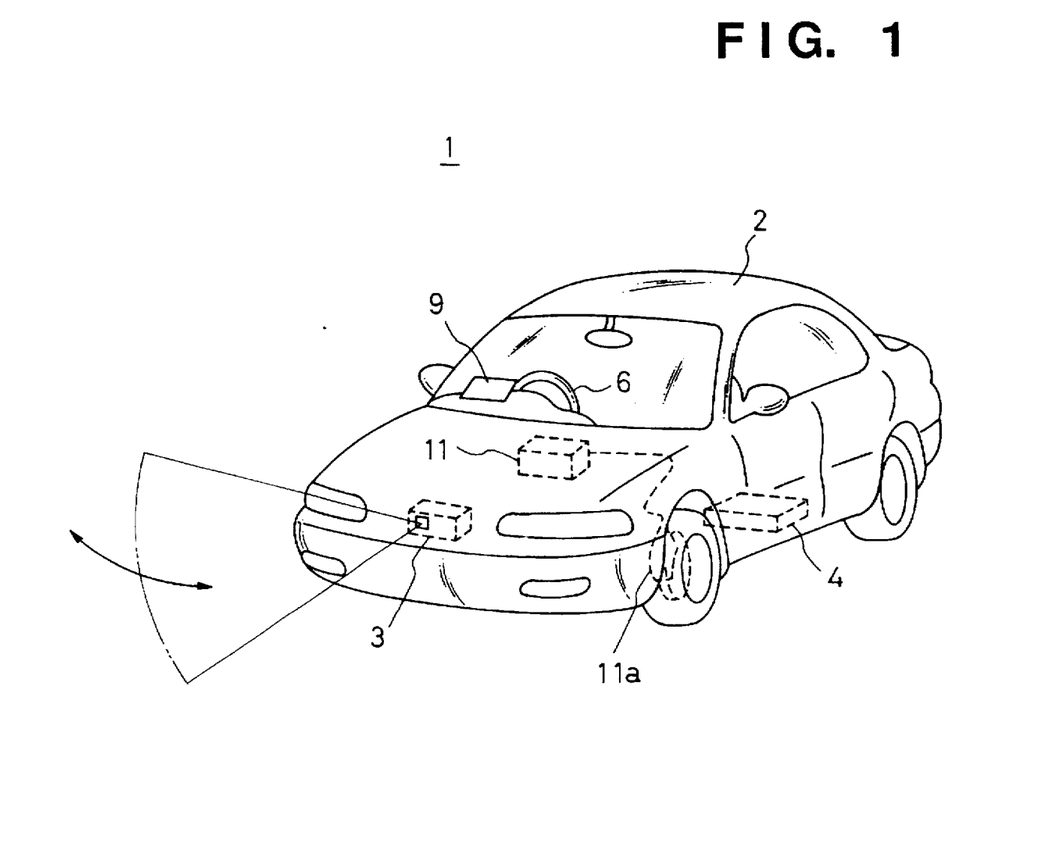
FIG. 1 is an overview of a vehicle according to an embodiment of the present invention.
Figure 2:
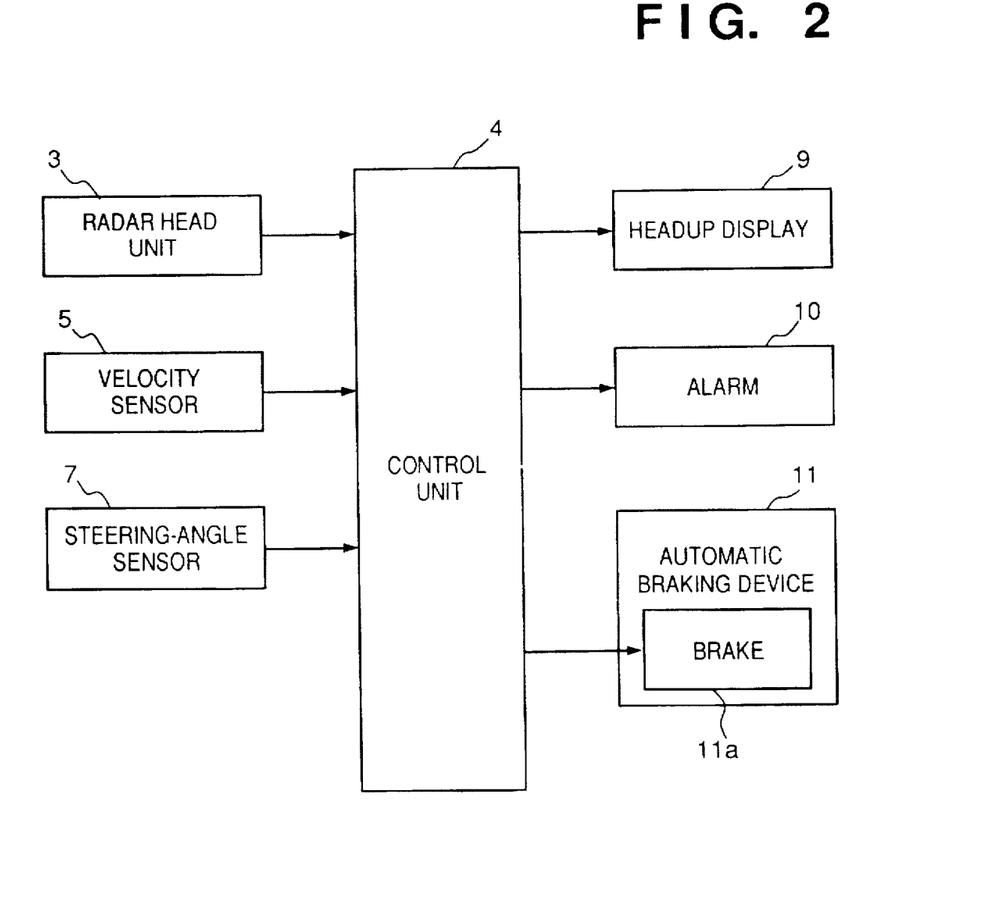
FIG. 2 is a block diagram showing a control system of the vehicle in FIG. 1.

FIG. 1 shows the construction of a vehicle according to an embodiment of the present invention. FIG. 2 shows a control system of the vehicle in FIG. 1.

In FIGS. 1 and 2, a vehicle 1 as a traveling vehicle has a radar head unit 3 (distance measuring apparatus) at a front portion of a vehicle body 2. The radar head unit 3 emits forward pulse laser signal as a radar wave from the vehicle. Also, the radar head unit 3 receives a reflected wave from an obstacle such as another vehicle which drives ahead at a receiver position, and measures a distance between the obstacle and the vehicle. The radar head unit 3 is a scan-type radar head which scans pulse laser signal (scan beam), extending in a vertical direction, within a relatively wide range in a horizontal direction.

A control unit 4 inputs the detection signals from the radar head unit 3, a velocity sensor 5 which detects a velocity of the vehicle and a steering-angle sensor 7 which detects a steering angle of a steering handle 6, and displays condition of the traveling path of the vehicle based on the detection signals, on a head-up display 9. When the control unit 4 detects an object in front of the vehicle, it activates an alarm 10 and activates the brake 11a by an automatic braking device to supply braking force to the respective wheels.

Figure 3:
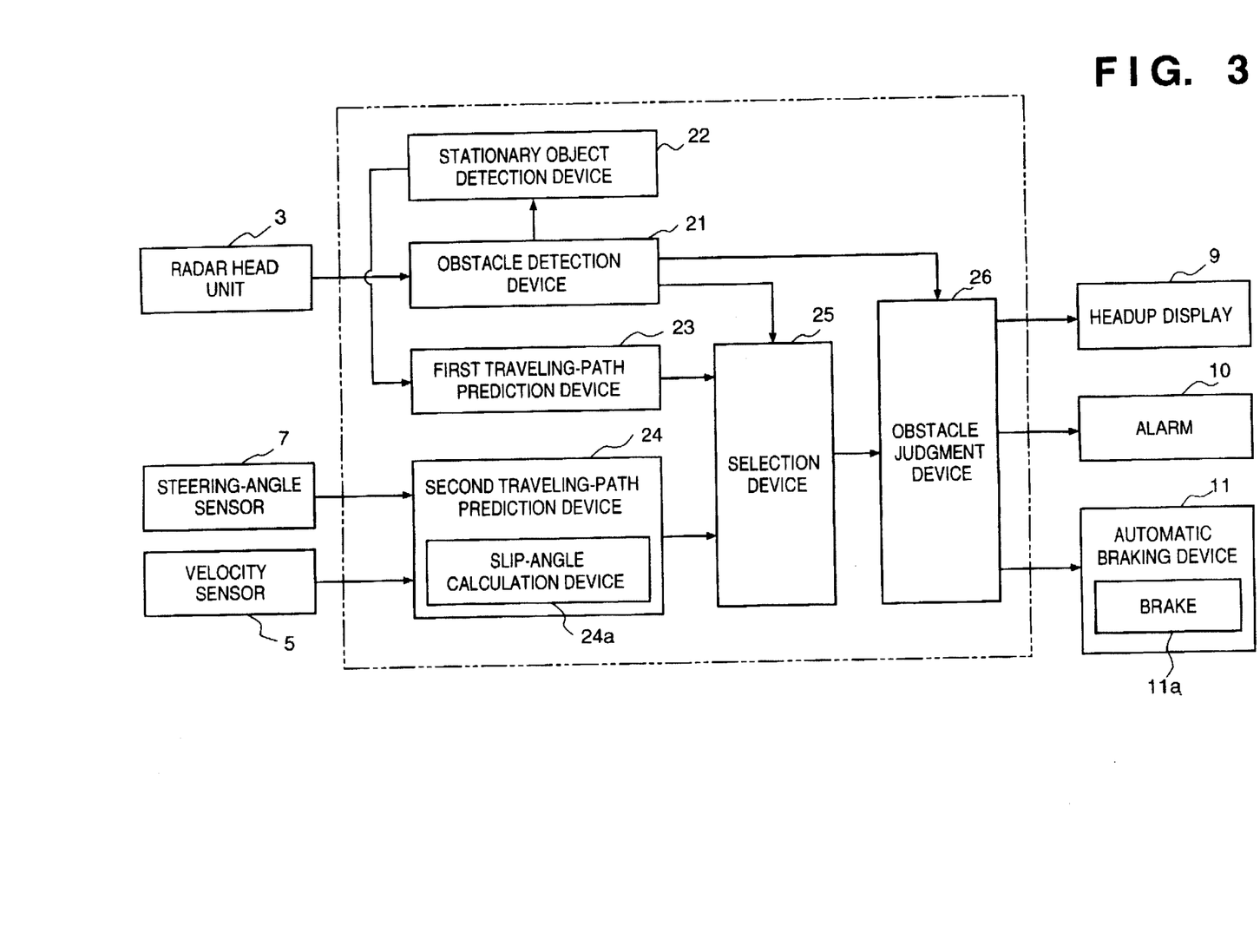
FIG. 3 is a block diagram showing the detailed construction of a control unit in FIG. 2.

FIG. 3 shows the detailed construction of the control unit in FIG. 2.

As shown in FIG. 3, the control unit 4 has obstacle detection device 21 for detecting an obstacle in front of the vehicle, stationary object detecting device 22 for receiving an output signal from the obstacle detection device 21 to detect a stationary object in front of the vehicle and first traveling-path prediction device 23 for receiving an output signal from the stationary object detecting device 22, and if there is a stationary object in front of the vehicle, calculating a radius of curvature R1 of a first traveling path, based on the following equation (1). The stationary object has as attributes, a distance L between the object and the vehicle, a direction $\phi$ of the stationary object viewed from the vehicle (calculation method will be given later), a relative velocity V between the stationary object and the vehicle and a velocity vt of transverse movement. The first traveling-path (i.e., the radius of curvature R1 of the first traveling-path) is calculated based on the detection signals from the radar head unit 3, the velocity sensor 5 and the steering angle sensor 7.

$$R1 = L(V \cos \phi/vt - \sin \phi) \quad (1)$$

Figure 5:
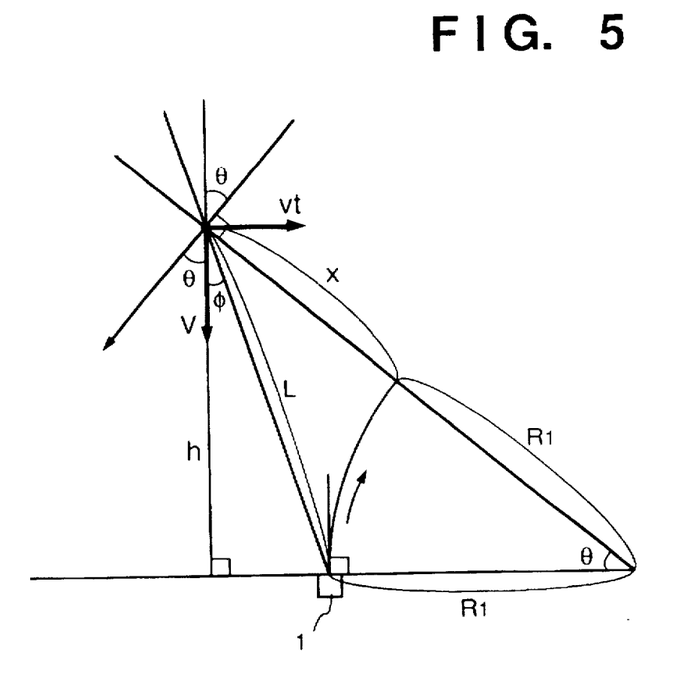
FIG. 5 is a trigonometrical function graph showing the positional relation between the vehicle, an obstacle and a traveling path.

The equation (1) is introduced as follows. FIG. 5 shows a positional relation between the vehicle and the obstacle and the predicted traveling path. In FIG. 5, if $$\sin \theta = h/(R1+x) \quad ①$$

$$h = L \cos \phi \quad ②$$

hold, $$(R1+x)\cos \theta = R1 + L \sin \phi \quad ③$$

Then, this equation can be transformed to $$R1 + x = (R1 + L \sin \phi)/\cos \theta$$

and the equations ① and ② are substituted into the above equation, an equation 1 is obtained to calculate the first traveling path R1:

$$\sin \theta = L \cos \phi \cos \theta/(R1 + L \sin \phi)$$

$$\sin \theta (R1 + L \sin \phi) = L \cos \phi \cos \theta$$

$$R1 = -L \sin \phi \times L \cos \phi \cos \theta/\sin \theta$$

$$= L \cos \phi/\tan \theta - L \sin \phi$$

$$= L(V \cos \phi/vt - \sin \phi)$$

Also, the control unit 4 has selection device 25, that receives detection signals from a second traveling-path prediction device 24 which calculates a second traveling-path (i.e., a radius of curvature R2 of the second traveling-path) using the following equation 2, based on a velocity V0 and a steering angle $\theta H$, and from the radar head unit 3. If no obstacle exists in front of the vehicle, the selection device 25 selects the second traveling path R2 calculated by the second traveling-path prediction device 24. The second traveling-path prediction device 24 has a slip-angle calculation device 24a for calculating a transverse slip angle (hereinafter, simply referred to as "slip angle") $\beta 2$, from the following equation 2b;

$$R2 = (1 + A \times V0^2) \times L \times N/\theta H \quad (2a)$$

$$\beta 2 = \{-1 + (m/2L)\} \times \{(Lf/LrKr) \times V0^2\}/(1 + A \times V0^2) \times \{(Lr/L) \times (\theta H/N)\}b) \quad$$

A: stability factor
N: steering gear ratio
L: wheel base
Lf: distance between vehicle center of gravity and front wheels
Lr: distance between vehicle center of gravity and rear wheels
m: vehicle mass
Kr: cornering power per rear wheel Upon prediction of the second traveling path (a radius of curvature R2 of second traveling path), the second traveling-path prediction device 24 uses the slip angle $\beta 2$, from the following equation (2):

$$\theta H = \theta + \beta 2 \quad (2c)$$

Further, the second traveling-path prediction device 24 calculates from a slip angle $\beta 2$ an area $\phi 1$ (the direction $\phi$ of the stationary object viewed from the vehicle) at an angle to include a stationary object positioned with distance Li from the vehicle. This area $\phi 1$ is obtained from the following equation (3), for calculation of the radius of curvature R1 of the first traveling path:

$$\phi1=Li/2R2-\beta2 \qquad (3)$$

Also, the control unit 4 has obstacle judgment device 26 that receives output signals from the obstacle detection device 21 and the selection device 25, and judges whether or not the status of a previously detected obstacle has been changed.

Next, the control procedure of the control unit 4 will be described with reference to the flowchart of FIG. 4.

Figure 4:
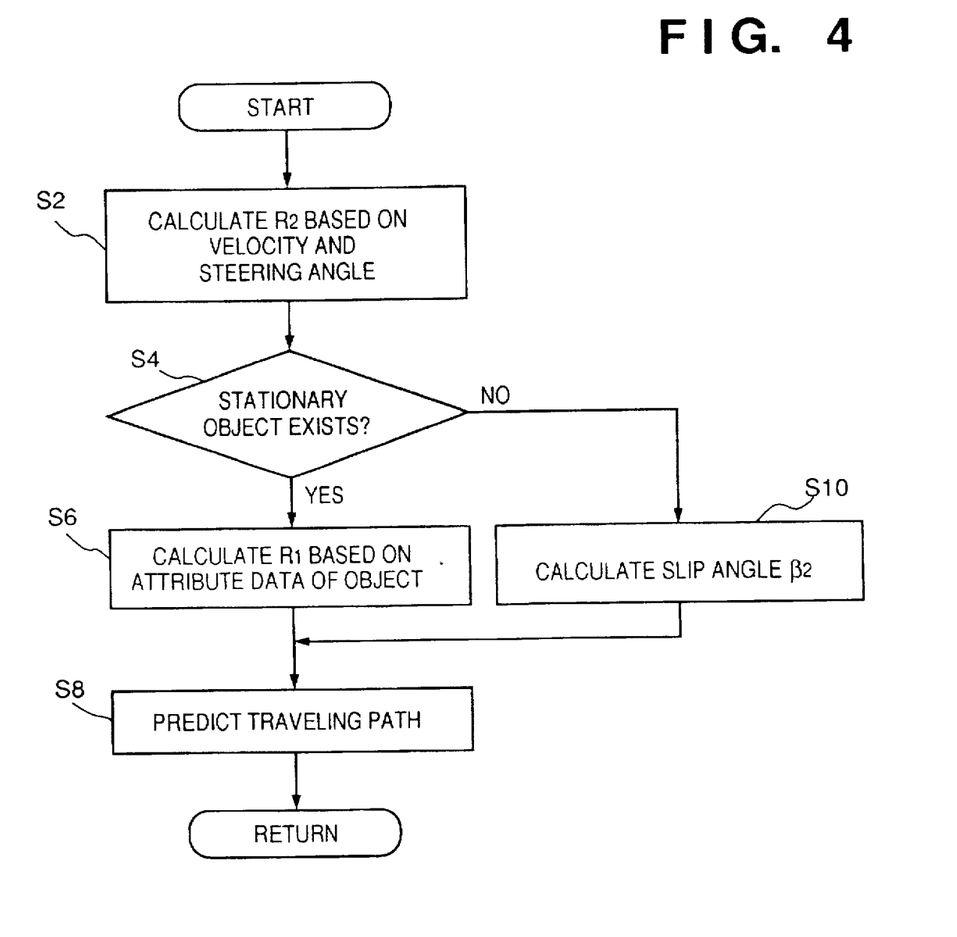
FIG. 4 is a flowchart showing a control procedure of the control unit.

In FIG. 4, when the process starts, at step S2, a radius of curvature R2 of the second traveling-path based on a velocity V0 and a steering angle θH is calculated by the second traveling-path prediction device 24, using the equation 2a.

At step S4, whether an object in front of the vehicle detected by the obstacle detection device 21 is a stationary object or not is determined by the stationary object detection device 22. If YES, i.e., it is determined that the obstacle is a stationary object, the process proceeds to step S6, at which a radius of curvature R1 of the first traveling-path based on the attribute of the stationary object is calculated by the first traveling-path prediction device 23.

At step S8, the radius of curvature R1 calculated by the first traveling-path prediction device 23 is predicted as the first traveling-path. Then, the process returns to step S2.

On the other hand, if NO at step S4, i.e., it is determined that the obstacle is not a stationary object, the process proceeds to step S10, at which a slip angle β2 is calculated by the slip-angle calculation device 24a from equation 2. The slip angle P2 and the radius of curvature R2 calculated by the second traveling-path prediction device 24 are predicted as the second traveling path (step S8). Then, the process returns to step S2.

[Another Embodiment]

The control procedure of the above embodiment is based on one obstacle, however, in a case where a plurality of obstacles exist in front of the vehicle, a traveling path can be predicted based on the plurality of obstacles. This control procedure executed by a control unit according to another embodiment will be described with reference to FIGS. 6 and 7.

Figure 6:
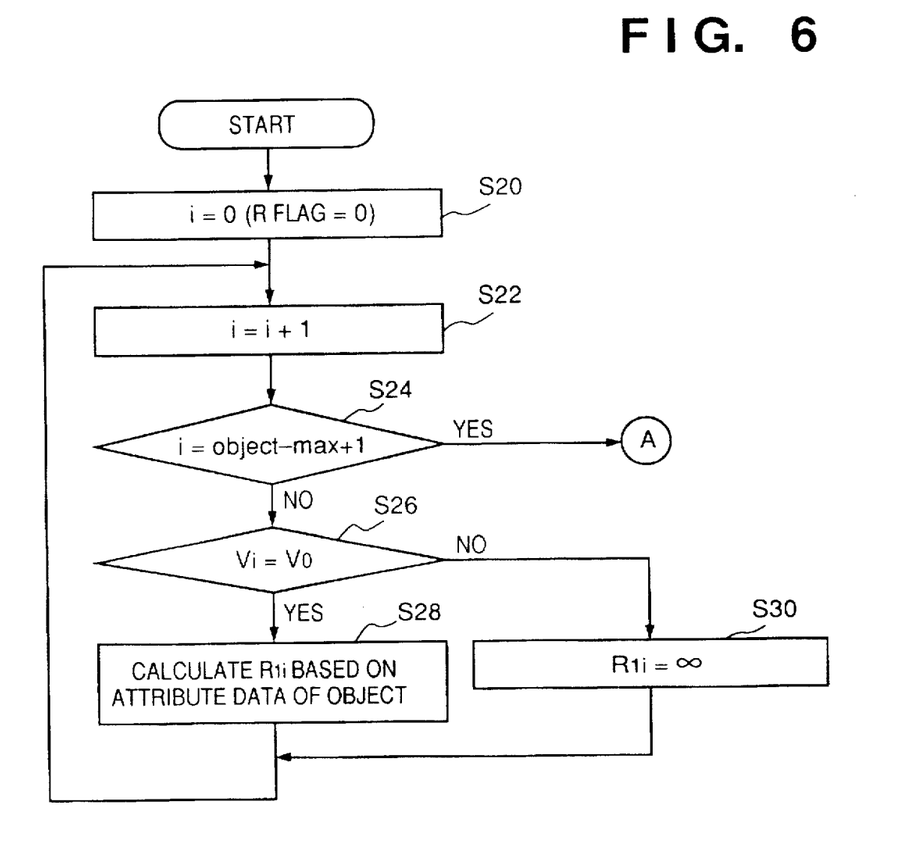
FIG. 6 is a flowchart showing a control procedure of a control unit according to another embodiment.
Figure 7:
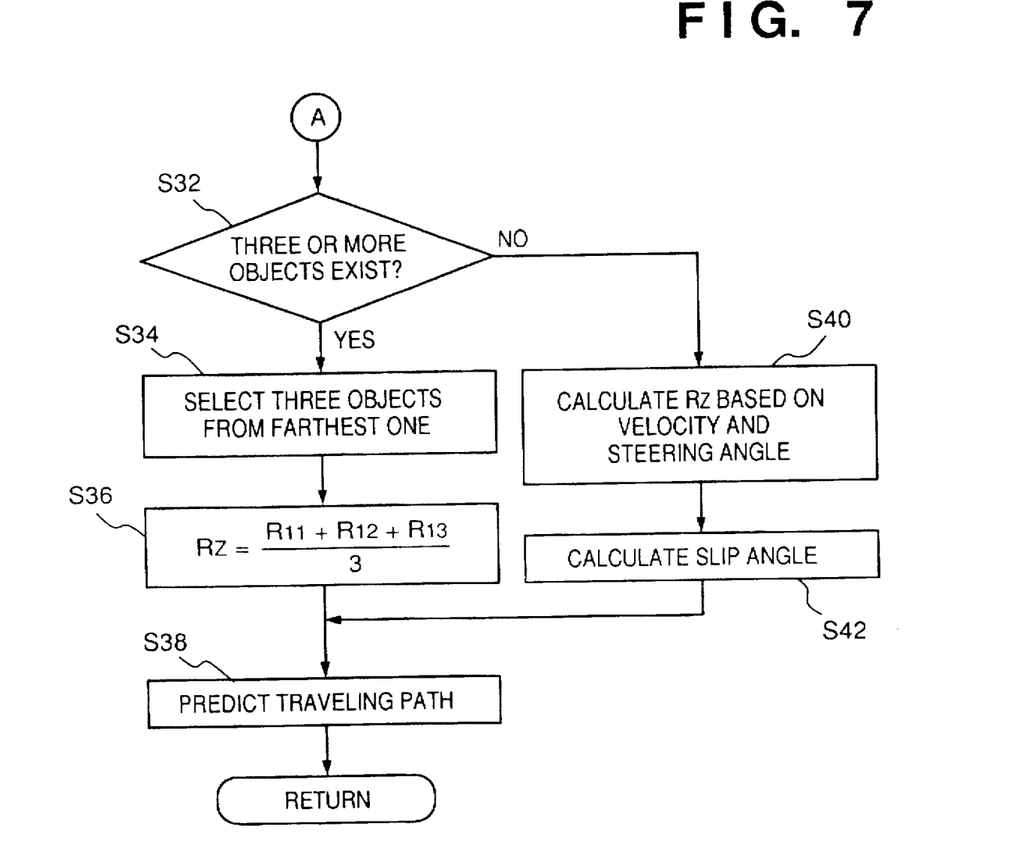
FIG. 7 is a flowchart showing a control procedure of the control unit in FIG. 6.

In FIGS. 6 and 7, as the process starts, an identification number i indicative of the number of obstacles is reset (i=0) at step S20. At step S22, as described later, a plurality of obstacles are sequentially examined as to whether they are stationary objects or not, the identification number i is incremented by one (i+1).

At step S24, whether the identification number i equals to the total number ((object-max)+1) of the objects or not is determined. That is, at step S24, whether or not all the objects have been examined is determined. If NO, i.e., it is determined that the identification number i does not equal to the total number, the process proceeds to step S26, at which whether a relative velocity Vi between the obstacle and the vehicle equals to a vehicle velocity V0 or not is determined. If YES, i.e., the relative velocity Vi equals to the vehicle velocity V0, it is judged that the obstacle is a stationary object, and the process proceeds to step S28. At step S28, a radius of curvature R1i of the first traveling path is calculated in accordance with the equation 1, i.e., the attribute of the respective stationary object (e.g., a distance Li between the stationary object i and the vehicle, a direction φi of the stationary object with respect to the vehicle, a relative velocity Vi, a velocity vti of lateral movement). Then, the process returns to step S22.

On the other hand, if NO at step S26, i.e., it is determined that the relative velocity Vi does not equal to the vehicle velocity V0, the process proceeds to step S30. At step S30, as the detected object is not a stationary object, it is determined that the radius of curvature R1i of the traveling path is infinite (Li=∞), then the process returns to step S22. Thereafter, the processing similar to that in steps S22 to S30 is performed.

If YES at step S24, i.e., it is determined that the object identification number i equals to the total number (object-max+1) of the objects, the process proceeds to step S32 in FIG. 7, at which whether three or more stationary objects exist or not is determined. If YES at step S32, i.e., there are three or more stationary objects, the process proceeds to step S34, at which three stationary objects, from the furthest one from the vehicle first, are selected. Thereafter, at step S36, an average value Rz of respective radii of curvatures R11, R12 and R13 of the selected stationary objects is calculated. At step S38, the average value Rz is predicted as a first traveling-path, then the process returns to step S22.

On the other hand, if NO at step S32, i.e., it is determined that the number of stationary objects is less than three, the process proceeds to step S40, at which a radius of curvature R2 of a second traveling-path is obtained, and a slip angle β2, is obtained at step S42, by the second traveling-path prediction device 24, from the equations 2a and 2b, based on the velocity V0 and the steering angle θH.

MODIFICATION

Figure 8:
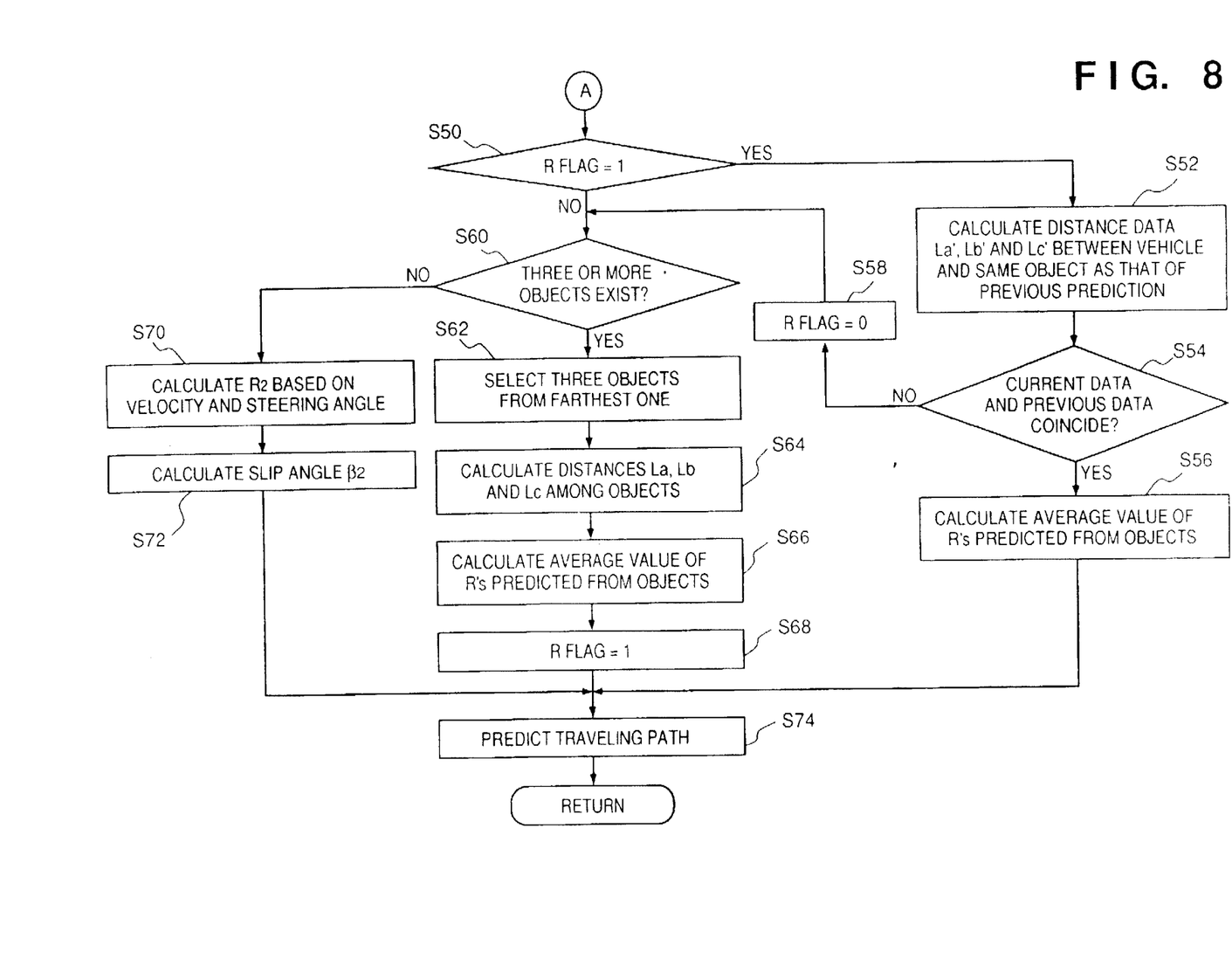
FIG. 8 is a flowchart showing a control procedure of a control unit as a modification to the control unit in FIG. 7.

The processing procedure shown in FIG. 7 may be modified to a procedure as shown in FIG. 8. In the modified processing procedure of the control unit in FIG. 8, the obstacle judgment device 26 receives output signals from the obstacle detection device 21 and the selection device 25, and judges whether the stationary status of a previously detected obstacle has been changed or not. FIG. 8 is a flowchart showing the control procedure of the control unit as the modification.

At first, at step S20 in FIG. 6, the object identification number i is reset, and an R flag to be described later is initialized to "0". Thereafter, at step S24 in FIG. 6, if the object identification number i equals to the total number ((object-max)+1) of the objects (YES at step S24), the process proceeds to step S50 in FIG. 8, at which whether a flag indicative of a traveling path R is "1" or not is determined. If the R flag value is "1" (YES at step S50), the process proceeds to step S52, at which distance data La', Lb' and Lc' indicative of distances between the vehicle and these objects, a, b and c are calculated.

On the other hand, if the R flag value is not "1" (NO at step S50), the process proceeds to step S60, at which whether there are three or more stationary objects or not is determined.

In the processing at step S50, the determination of "R flag value=1" is made to advance to step S60 at the initial stage. Accordingly, the R flag value is set to "0" at the beginning. If it is determined at step S60 that there are three or more stationary objects, a traveling-path R is predicted regarding the respective objects at step S66 to be described later. Thereafter, if the processing is repeated, the R flag value is set to "1" at step S68, then the process proceeds, not from step S50 to step S60, but from step S50 to S52, and processing after step S54 and the subsequent steps is executed, based on the object distance data, calculated in the processing at step S66 and the preceding steps, as previous value.

If there are three or more stationary objects at step S60 (YES at step S60), the process proceeds to step S62i at which three stationary objects, from the furthest one, are selected. At step S64, distances between the objects La, Lb and Lc are calculated, and an average value Rz of radii of curvatures R1a, R1b and R1c of the selected stationary objects is calculated (step S66). At step S68, a traveling path is predicted with the R flag value as "1" and the radius of curvature of the traveling path as Rz, then the process returns to step S22.

On the other hand, if it is determined that there are two or less stationary objects (NO at step S60), the process proceeds to steps S70 and S72, at which a radius of curvature R2 of a second traveling-path and a slip angle β2, based on the velocity V0 and the steering angle θH are calculated by the second traveling-path prediction device 24. Thereafter, the process proceeds to step S74.

After the distance data La', Lb' and Lc', distances between objects, are calculated at step S52, the obtained data are compared with the previously obtained data, and at step S54, whether they correspond or not is determined. if the data correspond with each other (YES at step S54), as the distances between the respective objects have not changed, i.e., the traveling path of the vehicle has not changed, an average value of the radii of curvatures R's predicted based on the objects is calculated at step S56, thus a traveling path is predicted at step S74.

On the other hand, if the data do not correspond (NO at step S54), the process proceeds to step S58, at which the R flag value is set to "0". Then process proceeds to step S60, at which three new objects are selected, and distances La, Lb and Lc among the objects are calculated. In this case, as the object distance data has changed from that of previous processing, i.e., the distance among the three stationary objects have changed, the traveling path of the vehicle may become a curved road or the handle has been rotated as in cornering.

As described above, according to the embodiments, a stationary object positioned in front of a vehicle is detected, and a traveling path on which the vehicle will run, is predicted based on data indicative of running conditions with respect to the stationary object. Thus, traveling-path prediction can be made by utilizing the stationary object detected by the radar head unit, without using a yaw rate sensor.

As described above, the second traveling-path prediction device predicts a traveling-path based on a velocity, a steering angle etc. If there is no stationary object in front of the vehicle, a traveling path predicted by the second traveling-path prediction device can be utilized. This always enables traveling-path prediction.

As described above, as the second traveling-path prediction device calculates a slip angle, if there is no stationary object in front of the vehicle, a traveling path including the slip angle can be predicted.

As described above, a plurality of stationary objects are detected, and a traveling path on which the vehicle will run is predicted based on data indicative of running conditions with respect to the respective stationary objects, prediction precision can be improved.

The present invention is not limited to the above embodiments and various changes and modifications can be made within the spirit and scope of the present invention. Therefore, to apprise the public of the scope of the present invention the following claims are made.

What is claimed is:

1. A vehicle traveling-path prediction apparatus which detects an obstacle in front of a vehicle and predicts a traveling path of the vehicle based on the detected obstacle, comprising:

obstacle detection means for emitting a radar wave forward from the vehicle and detecting an obstacle existing in front of the vehicle;

stationary-status judgment means for judging whether the obstacle in front of the vehicle is in a stationary status or not, based on the result from detection by said obstacle detection means; and traveling-path prediction means for predicting a traveling path of the vehicle from data indicative of running conditions of the vehicle with respect to the obstacle, if said stationary-status judgment means judges that the obstacle is in the stationary status.

2. The vehicle traveling-path prediction apparatus according to claim 1, further comprising:

steering-angle detection means for detecting a steering angle of the vehicle; and velocity detection means for detecting a velocity of the vehicle;

wherein said traveling-path prediction means includes:

first traveling-path prediction means for, if said stationary-status judgment means judges that the obstacle is in stationary status, predicting a first traveling path of the vehicle from data indicative of running conditions of the vehicle with respect to the obstacle; and second traveling-path prediction means for, if said stationary-status judgment means judges that the obstacle is not in stationary status, predicting a second traveling path of the vehicle based on the steering angle detected by said steering-angle detection means and the velocity detected by said velocity detection means.

3. The vehicle traveling-path prediction apparatus according to claim 2, wherein said first traveling-path prediction means calculates a radius of curvature of the first traveling path from data indicative of running conditions of the vehicle with respect to the obstacle.

4. The vehicle traveling-path prediction apparatus according to claim 2, wherein said second traveling-path prediction means calculates a radius of curvature of the second traveling path based on the steering angle detected by said steering-angle detection means and the velocity detected by said velocity detection means, and calculates a lateral slip angle of the vehicle.

5. The vehicle traveling-path prediction apparatus according to claim 4, wherein said second traveling-path prediction means calculates the direction of the obstacle viewed from the vehicle, based on the lateral slip angle.

6. The vehicle traveling-path prediction apparatus according to claim 2, further comprising selection means for, if said stationary-status judgment means judges that the obstacle is in stationary status, selecting the first traveling path predicted by said first traveling-path prediction means, while if said stationary-status judgment means judges that the obstacle is not in stationary status, selecting the second traveling path predicted by said second traveling-path prediction means.

7. The vehicle traveling-path prediction apparatus according to claim 2, wherein the data indicative of running conditions of the vehicle are distance between the vehicle and the obstacle, a direction of the obstacle viewed from the vehicle, a relative velocity between the vehicle and the obstacle and a velocity of transverse movement.

8. The vehicle traveling-path prediction apparatus according to claim 2, wherein said first traveling-path prediction means calculates the radius of curvature of the first traveling path from data indicative of running conditions of the vehicle with respect to a plurality of objects.

9. A vehicle traveling-path prediction apparatus according to claim 1, further comprising:
- obstacle judgment means for judging whether status of the obstacle judged as in the stationary status by said stationary-status judgment means has changed or not, and whether running conditions of the vehicle with respect to the obstacle have changed or not;
- wherein said obstacle detection means detects a plurality of obstacles existing in front of the vehicle;
- wherein said stationary-status judgment means respectively judges whether the obstacles in front of the vehicle are in stationary status or not, based on the result from detection by said obstacle detection means, and
- wherein said traveling-path prediction means judges whether present data indicative of the running conditions of the vehicle with respect to the objects coincides with previous data used in a previous prediction or not, and if they coincide, predicts a radius of curvature of a traveling-path of the vehicle calculated based on the present data, as a first traveling-path.

10. The vehicle traveling-path prediction apparatus according to claim 9, further comprising:
- steering-angle detection means for detecting a steering angle of the vehicle; and
- velocity detection means for detecting a velocity of the vehicle,
- wherein said traveling-path prediction means includes:
  - first traveling-path prediction means for, if said stationary-status judgment means judges that the obstacles are in stationary status, predicting a first traveling path of the vehicle from data indicative of running conditions of the vehicle with respect to the obstacles; and
  - second traveling-path prediction means for, if said stationary-status judgment means judges that the obstacles are not in stationary status, predicting a second traveling path of the vehicle based on the steering angle detected by said steering-angle detection means and the velocity detected by said velocity detection means.

11. The vehicle traveling-path prediction apparatus according to claim 10, wherein said first traveling-path prediction means calculates a radius of curvature of the first traveling path from data indicative of running conditions of the vehicle with respect to the respective obstacles.

12. The vehicle traveling-path prediction apparatus according to claim 11, wherein if there are three or more obstacles, said first traveling-path prediction means selects a first obstacle farthest from the vehicle, a second obstacle second farthest from the vehicle and a third obstacle third farthest from the vehicle, and predicts an average value of radius of curvatures of traveling-paths calculated from the data indicative of running conditions of the vehicle with respect to each obstacle, as the first traveling path.

13. The vehicle traveling-path prediction apparatus according to claim 10, wherein said second traveling-path prediction means calculates a radius of curvature of the second traveling path based on the steering angle detected by said steering-angle detection means and the velocity detected by said velocity detection means, and calculates a lateral slip angle of the vehicle.

14. The vehicle traveling-path prediction apparatus according to claim 10, wherein the data indicative of running conditions of the vehicle with respect to the respective obstacles are distances between the vehicle and the obstacles, directions of the obstacles viewed from the vehicle, relative velocities between the vehicle and the obstacles and a velocity of transverse movement.

15. The vehicle traveling-path prediction apparatus according to claim 9, wherein if the data indicative of the running conditions of the vehicle with respect to the objects does not coincide with the previous data, said traveling-path prediction means newly predicts a traveling path of the vehicle.

16. The vehicle traveling-path prediction apparatus according to claim 9, wherein if a plurality of obstacles existing in front of the vehicle are detected by said obstacle detection means, said traveling-path prediction means predicts a traveling path of the vehicle, based on the farthest obstacle from the vehicle.

17. The vehicle traveling-path prediction apparatus according to claim 1, wherein if a plurality of obstacles existing in front of the vehicle are detected by said obstacle detection means, said traveling-path prediction means predicts a traveling path of the vehicle, based on the farthest obstacle from the vehicle.

18. A vehicle traveling-path prediction method for detecting an obstacle in front of a vehicle and predicting a traveling path of the vehicle based on the detected obstacle, comprising:
- an obstacle detection step of emitting a radar wave forward from the vehicle and detecting an obstacle existing in front of the vehicle;
- a stationary-status judgment step of judging whether the obstacle in front of the vehicle is in stationary status or not, based on the result from detection at said obstacle detection step; and
- a traveling-path prediction step of predicting a traveling path of the vehicle from data indicative of running conditions of the vehicle with respect to the obstacle, if the obstacle is in stationary status at said stationary-status judgment step.

19. The vehicle traveling-path prediction method according to claim 18, further comprising:
- a steering-angle detection step of detecting a steering angle of the vehicle, and
- a velocity detection step of detecting a velocity of the vehicle;
- wherein said traveling-path prediction step includes:
  - a first traveling-path prediction step of, if it is judged at said stationary-status judgment step that the obstacle is in stationary status, predicting a first traveling path of the vehicle from data indicative of running conditions of the vehicle with respect to the obstacle; and
  - a second traveling-path prediction step of, if it is judged at said stationary-status judgment step that the obstacle is not in stationary status, predicting a second traveling path of the vehicle based on the steering angle detected at said steering-angle detection step and the velocity detected at said velocity detection step.

20. The vehicle traveling-path prediction method according to claim 19, wherein at said first traveling-path prediction step, a radius of curvature of the first traveling path is calculated from data indicative of from data indicative of running conditions of the vehicle with respect to the obstacle.

21. The vehicle traveling-path prediction method according to claim 19, wherein at said second traveling-path prediction step, a radius of curvature of the second traveling path is calculated based on the steering angle detected at said steering-angle detection step and the velocity detected at said velocity detection step, and a lateral slip angle of the vehicle is calculated.

22. The vehicle traveling-path prediction method according to claim 19, wherein the data indicative of running conditions of the vehicle are a distance between the vehicle and the obstacle, a direction of the obstacle viewed from the vehicle, a relative velocity between the vehicle and the obstacle and a velocity of transverse movement.

23. The vehicle traveling-path prediction method according to claim 19, wherein at said first traveling-path prediction step, a radius of curvature of the first traveling path is calculated from data indicative of running conditions of the vehicle with respect to a plurality of obstacles.

24. The vehicle traveling-path prediction method according to claim 23, wherein if there are three or more obstacles, at said first traveling-path prediction step, three obstacles, from the farthest one, are selected, and an average value of radii of curvatures of traveling-paths are calculated from the data indicative of running conditions, as the first traveling path.

25. A vehicle traveling-path prediction method according to claim 18, further comprising:
- a obstacle judgment step of judging whether status of the obstacle judged as in the stationary status at said stationary-status judgment step has changed or not, and whether running conditions of the vehicle with respect to the obstacle have changed or not;
- wherein at said obstacle detection step, a plurality of obstacles existing in front of the vehicle are detected;
- wherein at said stationary-status judgment step, whether the obstacles in front of the vehicle are in stationary status or not is judged respectively, based on the result from detection of said obstacle detection step; and
- wherein at said traveling-path prediction step whether present data indicative of the running conditions of the vehicle with respect to the obstacles coincides with previous data used in a previous prediction or not is judged, and if they coincide, a radius of curvature of a traveling path of the vehicle calculated based on the present data is predicted as a first traveling path.

26. The vehicle traveling-path prediction method according to claim 25, further comprising:
- a steering-angle detection step of detecting a steering angle of the vehicle: and
- a velocity detection step of detecting a velocity of the vehicle;
- wherein said traveling-path prediction step includes:
- a first traveling-path prediction step of, if the number of objects judged as in the stationary status at said stationary-status judgment step is a predetermined number or greater, predicting the first traveling path of the vehicle from data indicative of running conditions of the vehicle with respect to the objects; and a second traveling-path prediction step of, if the number of objects judged as in the stationary status at said stationary-status judgment step is less than the predetermined number, predicting the second traveling path based on the steering angle detected at said steering-angle detection step and the velocity detected at said velocity detection step.

27. The vehicle traveling-path prediction method according to claim 26, wherein at said first traveling-path prediction step, a radius of curvature of the first traveling path is calculated from data indicative of running conditions of the vehicle with respect to the respective obstacles.

28. The vehicle traveling-path prediction method according to claim 27, wherein if there are three or more obstacles, a first obstacle farthest from the vehicle, a second obstacle second farthest from the vehicle and a third obstacle third farthest from the vehicle are selected, and an average value of radius of curvatures of traveling-paths calculated from the data indicative of running conditions of the vehicle with respect to each obstacle is predicted as the first traveling path, at said first traveling-path prediction step.

29. The vehicle traveling-path prediction method according to claim 26, wherein at said second traveling-path prediction step, a radius of curvature of the second traveling path is calculated bas ed on the steering angle detected at said steering-angle detection step and the velocity detected at said velocity detection step, and a lateral slip angle of the vehicle is calculated.

30. The vehicle traveling-path prediction method according to claim 26, wherein the data indicative of running conditions of the vehicle with respect to the respective obstacles are distances between the vehicle and the obstacles, directions of the obstacles viewed from the vehicle, relative velocities between the vehicle and the obstacles and a velocity of transverse movement.

31. The vehicle traveling prediction method according to claim 25, wherein if the data indicative of the running conditions of the vehicle with respect to the objects does not coincide with the previous data, a traveling path of the vehicle is newly predicted at said traveling-path prediction step.

32. The vehicle traveling-path prediction method according to claim 25, wherein if a plurality of obstacles existing in front of the vehicle are detected at said obstacle detection step, at said traveling-path prediction step, a traveling path of the vehicle is predicted, based on the farthest obstacle from the vehicle.

33. The vehicle traveling-path prediction method according to claim 18, wherein if a plurality of obstacles existing in front of the vehicle are detected at said obstacle detection step, at said traveling-path prediction step, a traveling path of the vehicle is predicted, based on the farthest obstacle from the vehicle.

* * * * *

UNITED STATES PATENT AND TRADEMARK OFFICE
CERTIFICATE OF CORRECTION

PATENT NO. : 5,745,870
DATED : April 28 1998
INVENTOR(S) : Yasunori Yamamoto, et al.

It is certified that error appears in the above-identified patent and that said Letters Patent is hereby corrected as shown below:

Column 4, line 24, change "$\phi XL$"" to --$\phi + L$--;
line 32, change "2" to --2a--;
line 58, change "2" to --2c--.

Column 5, line 27, change "2" to --2b--;
line 28, change "P2" to --$\beta 2$--.

Column 6, line 65, change "$S62_1$" to --S62,--.

Column 10, line 34, after "vehicle" insert --,--.

Column 11, line 35, Claim 25, after "step" insert --,--.

Column 12, line 24, Claim 29, line 25, "bas ed" to --based--.

Signed and Sealed this

Twenty-second Day of September, 1998

Attest:

BRUCE LEHMAN

Attesting Officer    Commissioner of Patents and Trademarks